United States Patent
Elshafie et al.

(10) Patent No.: US 12,452,658 B2
(45) Date of Patent: Oct. 21, 2025

(54) MULTIPLEXING SECURE PHYSICAL UPLINK CHANNELS

(71) Applicant: QUALCOMM Incorporated, San Diego, CA (US)

(72) Inventors: Ahmed Elshafie, San Diego, CA (US); Hung Dinh Ly, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 476 days.

(21) Appl. No.: 17/466,960

(22) Filed: Sep. 3, 2021

(65) Prior Publication Data
US 2023/0069923 A1    Mar. 9, 2023

(51) Int. Cl.
*H04W 12/0431* (2021.01)
*H04W 12/03* (2021.01)
*H04W 12/041* (2021.01)
*H04W 12/122* (2021.01)

(52) U.S. Cl.
CPC ....... *H04W 12/0431* (2021.01); *H04W 12/03* (2021.01); *H04W 12/041* (2021.01); *H04W 12/122* (2021.01)

(58) Field of Classification Search
CPC ............ H04W 12/0431; H04W 12/03; H04W 12/122; H04W 12/041
See application file for complete search history.

(56) References Cited

U.S. PATENT DOCUMENTS

| | | | |
|---|---|---|---|
| 9,716,728 B1* | 7/2017 | Tumulak | H04L 9/083 |
| 2008/0120657 A1* | 5/2008 | Dong | H04N 21/4367 |
| | | | 725/82 |
| 2010/0091990 A1* | 4/2010 | Etemad | H04J 14/005 |
| | | | 398/79 |
| 2010/0303241 A1* | 12/2010 | Breyel | G06F 21/602 |
| | | | 380/29 |
| 2015/0245277 A1* | 8/2015 | Hassan | H04W 12/06 |
| | | | 370/329 |
| 2016/0197723 A1* | 7/2016 | Takahashi | G06F 11/0709 |
| | | | 380/255 |
| 2016/0248809 A1* | 8/2016 | Smith | H04L 63/20 |
| 2018/0034794 A1* | 2/2018 | Pandey | H04L 9/0891 |
| 2019/0069167 A1* | 2/2019 | Rowell | H04L 63/18 |
| 2019/0124502 A1* | 4/2019 | Zhang | H04L 63/062 |
| 2023/0141478 A1* | 5/2023 | Zhang | H04W 40/12 |
| | | | 370/315 |

* cited by examiner

*Primary Examiner* — William R Korzuch
*Assistant Examiner* — Forrest L Carey
(74) *Attorney, Agent, or Firm* — Holland & Hart LLP

(57) ABSTRACT

Methods, systems, and devices for wireless communications are described. The method includes selecting a first secure physical uplink channel and a second secure physical uplink channel for multiplexing based on the first secure physical uplink channel and second secure physical uplink channel overlapping, generating a secret key based on selecting the first secure physical uplink channel and the second secure physical uplink channel for multiplexing in accordance with the first secure physical uplink channel overlapping the second secure physical uplink channel in time, generating multiplexed information based on multiplexing the first secure physical uplink channel and the second secure physical uplink channel, and encrypting the multiplexed information based on the secret key.

27 Claims, 10 Drawing Sheets

MULTIPLEXING SECURE PHYSICAL UPLINK CHANNELS

FIELD OF TECHNOLOGY

The following relates to wireless communications, including multiplexing secure physical uplink channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless systems may support multiplexing physical uplink channels. In some cases, it may be desirable to increase security of multiplexed physical uplink channels.

SUMMARY

The described techniques relate to improved methods, systems, devices, and apparatuses that support multiplexing secure physical uplink channels. Generally, the described techniques provide for a user equipment (UE) selecting a first secure physical uplink channel and a second secure physical uplink channel for multiplexing based on the first secure physical uplink channel and second secure physical uplink channel overlapping (e.g., overlapping at least partially in time). In some cases, the described techniques provide for the UE generating a key, such as a secret key based on the first secure physical uplink channel and the second secure physical uplink channel being selected for multiplexing. In some cases, the described techniques provide for the UE generating multiplexed information when the UE multiplexes the first secure physical uplink channel and the second secure physical uplink channel. In some cases, the described techniques provide for the UE encrypting the multiplexed information based on the key, such as the secret key, generated by the UE.

A method for wireless communication is described. The method may include selecting a first secure physical uplink channel and a second secure physical uplink channel for multiplexing based on the first secure physical uplink channel and second secure physical uplink channel overlapping, generating a secret key based on selecting the first secure physical uplink channel and the second secure physical uplink channel for multiplexing in accordance with the first secure physical uplink channel overlapping the second secure physical uplink channel in time, generating multiplexed information based on multiplexing the first secure physical uplink channel and the second secure physical uplink channel, and encrypting the multiplexed information based on the secret key.

An apparatus for wireless communication is described. The apparatus may include a processor, memory coupled with the processor, and instructions stored in the memory. The instructions may be executable by the processor to cause the apparatus to select a first secure physical uplink channel and a second secure physical uplink channel for multiplexing based on the first secure physical uplink channel and second secure physical uplink channel overlapping, generate a secret key based on selecting the first secure physical uplink channel and the second secure physical uplink channel for multiplexing in accordance with the first secure physical uplink channel overlapping the second secure physical uplink channel in time, generate multiplexed information based on multiplexing the first secure physical uplink channel and the second secure physical uplink channel, and encrypt the multiplexed information based on the secret key.

Another apparatus for wireless communication is described. The apparatus may include means for selecting a first secure physical uplink channel and a second secure physical uplink channel for multiplexing based on the first secure physical uplink channel and second secure physical uplink channel overlapping, means for generating a secret key based on selecting the first secure physical uplink channel and the second secure physical uplink channel for multiplexing in accordance with the first secure physical uplink channel overlapping the second secure physical uplink channel in time, means for generating multiplexed information based on multiplexing the first secure physical uplink channel and the second secure physical uplink channel, and means for encrypting the multiplexed information based on the secret key.

A non-transitory computer-readable medium storing code for wireless communication is described. The code may include instructions executable by a processor to select a first secure physical uplink channel and a second secure physical uplink channel for multiplexing based on the first secure physical uplink channel and second secure physical uplink channel overlapping, generate a secret key based on selecting the first secure physical uplink channel and the second secure physical uplink channel for multiplexing in accordance with the first secure physical uplink channel overlapping the second secure physical uplink channel in time, generate multiplexed information based on multiplexing the first secure physical uplink channel and the second secure physical uplink channel, and encrypt the multiplexed information based on the secret key.

Some examples of the method, apparatuses, and non-transitory computer-readable medium described herein may further include operations, features, means, or instructions for transmitting the encrypted multiplexed information on a resource associated with the first secure physical uplink channel or a resource associated with the second secure physical uplink channel.

In some examples of the method, apparatuses, and non-transitory computer-readable medium described herein, generating the secret key may include operations, features, means, or instructions for using a first physical channel key associated with the first secure physical uplink channel and a second physical channel key associated with the second secure physical uplink channel to generate the secret key.

In some examples of the method, apparatuses, and non-transitory computer-readable medium described herein, generating the secret key may include operations, features, means, or instructions for determining a security state of a first physical channel key associated with the first secure physical uplink channel exceeds a security state of a second physical channel key associated with the second secure physical uplink channel and using a copy of the first physical channel key as the secret key based on the security state of the first physical channel key exceeding the security state of the second physical channel key.

In some examples of the method, apparatuses, and non-transitory computer-readable medium described herein, generating the secret key may include operations, features, means, or instructions for determining a security state of a first physical channel key associated with the first secure physical uplink channel matches a security state of a second physical channel key associated with the second secure physical uplink channel, determining the first secure physical uplink channel may be associated with a higher priority than the second secure physical uplink channel based on the security state of the first physical channel key matching the security state of the second physical channel key, and using a copy of the first physical channel key as the secret key based on the first secure physical uplink channel being associated with the higher priority than the second secure physical uplink channel.

In some examples of the method, apparatuses, and non-transitory computer-readable medium described herein, generating the secret key may include operations, features, means, or instructions for determining that the first secure physical uplink channel may be associated with a higher priority than the second secure physical uplink channel and using a copy of a first physical channel key associated with the first secure physical uplink channel as the secret key based on the first secure physical uplink channel being associated with the higher priority in relation to the second secure physical uplink channel.

In some examples of the method, apparatuses, and non-transitory computer-readable medium described herein, generating the secret key may include operations, features, means, or instructions for deriving a new key based on passing a first physical channel key associated with the first secure physical uplink channel and a second physical channel key associated with the second secure physical uplink channel through a key derivation function, an output of the key derivation function including the new key.

Some examples of the method, apparatuses, and non-transitory computer-readable medium described herein may further include operations, features, means, or instructions for receiving, from a base station, a security configuration indicating which physical channel key to use between a first physical channel key associated with the first secure physical uplink channel and a second physical channel key associated with the second secure physical uplink channel.

In some examples of the method, apparatuses, and non-transitory computer-readable medium described herein, generating the secret key may include operations, features, means, or instructions for using a copy of the first physical channel key as the secret key based on the security configuration.

In some examples of the method, apparatuses, and non-transitory computer-readable medium described herein, a first binary value in the security configuration indicates to use a lower priority channel between the first secure physical uplink channel and the second secure physical uplink channel, and a second binary value in the security configuration indicates to use a higher priority channel between the first secure physical uplink channel and the second secure physical uplink channel.

In some examples of the method, apparatuses, and non-transitory computer-readable medium described herein, the security configuration includes a bitmap or a key derivation function, the security configuration indicating to use at least a portion of a first physical channel key associated with the first secure physical uplink channel or at least a portion of a second physical channel key associated with the second secure physical uplink channel, or both, with the bitmap or the key derivation function to generate the secret key.

In some examples of the method, apparatuses, and non-transitory computer-readable medium described herein, the security configuration may be received in a downlink control information, radio resource control, or media access control control element, or any combination thereof.

Some examples of the method, apparatuses, and non-transitory computer-readable medium described herein may further include operations, features, means, or instructions for determining a first security state of a first physical channel key associated with the first secure physical uplink channel and a second security state of a second physical channel key associated with the second secure physical uplink channel and determining whether the first security state or the second security state, or both, satisfy a security threshold, where generating the secret key may be based on whether the first security state or the second security state, or both, satisfy the security threshold.

Some examples of the method, apparatuses, and non-transitory computer-readable medium described herein may further include operations, features, means, or instructions for tracking a quality of the secret key based on a security degradation function.

Some examples of the method, apparatuses, and non-transitory computer-readable medium described herein may further include operations, features, means, or instructions for generating a second secret key to replace the secret key when the quality of the secret key does not satisfy a quality threshold.

In some examples of the method, apparatuses, and non-transitory computer-readable medium described herein, the security degradation function computes the quality of the secret key based on a dividend value, an addend value, and a usage number that indicates a number of times the secret key may have been used.

In some examples of the method, apparatuses, and non-transitory computer-readable medium described herein, the dividend value, the addend value, or the security degradation function, or any combination thereof, may be defined in a security configuration.

Some examples of the method, apparatuses, and non-transitory computer-readable medium described herein may further include operations, features, means, or instructions for indicating to a base station an acknowledgement to use the security degradation function to track the quality of the secret key.

Some examples of the method, apparatuses, and non-transitory computer-readable medium described herein may further include operations, features, means, or instructions for applying the security degradation function each time the secret key may be used.

Some examples of the method, apparatuses, and non-transitory computer-readable medium described herein may further include operations, features, means, or instructions for tracking a quality of the secret key based on a security degradation timer.

In some examples of the method, apparatuses, and non-transitory computer-readable medium described herein, the security degradation timer may be defined in a security configuration.

In some examples of the method, apparatuses, and non-transitory computer-readable medium described herein, the first secure physical uplink channel may be secured by a first physical channel key and the second secure physical uplink channel may be secured by a second physical channel key, and an upper layer provides the first physical channel key and the second physical channel key to a physical layer associated with the first secure physical uplink channel and the second secure physical uplink channel.

In some examples of the method, apparatuses, and non-transitory computer-readable medium described herein, the first secure physical uplink channel may be secured by a first set of physical channel parameters and the second secure physical uplink channel may be secured by a second set of physical channel parameters.

In some examples of the method, apparatuses, and non-transitory computer-readable medium described herein, the first set of physical channel parameters include one or more first random timing values associated with a transmitter or a receiver, or both, of the first secure physical uplink channel, and the second set of physical channel parameters include one or more second random timing values associated with a transmitter or a receiver, or both, of the second secure physical uplink channel.

In some examples of the method, apparatuses, and non-transitory computer-readable medium described herein, the first random timing values or the second random timing values, or both, may be based on a time stamp of a transmission, a time stamp of a reception, a period of time between a transmission and a reception, a period of time between a reception and a transmission, a period of time between a first transmission and a second transmission, or a period of time between a first reception and a second reception, or any combination thereof.

DETAILED DESCRIPTION

Figure 1:
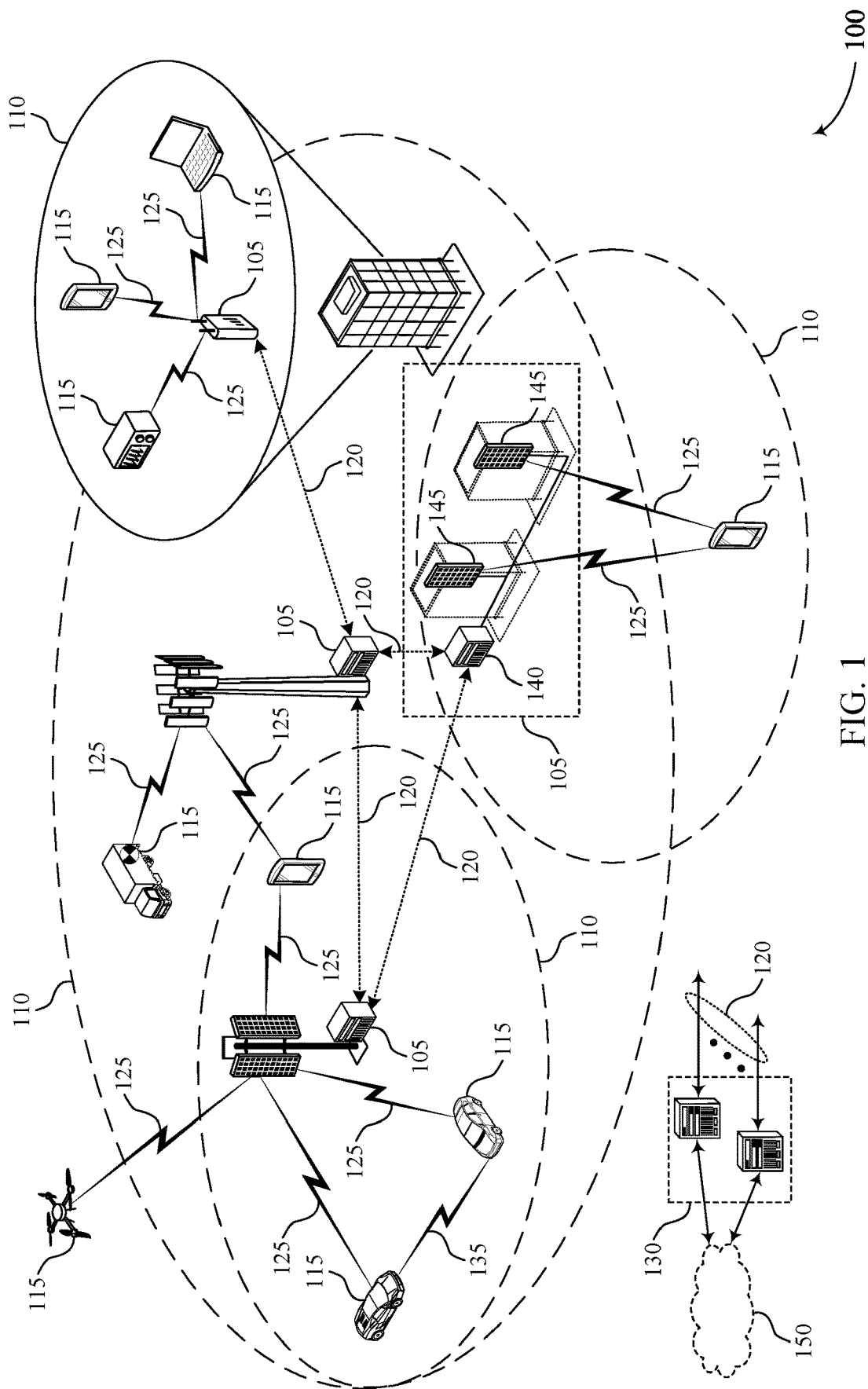
FIG. 1 illustrates an example of a wireless communications system that supports multiplexing secure physical uplink channels in accordance with aspects of the present disclosure.

The present techniques relate to multiplexing secure physical uplink channels. The present techniques may provide increased security in wireless communications systems. Secure communications are an increasingly important aspect of wireless communications systems. These secure communications are a fundamental aspect of wireless devices such as internet-of-things (IoT) devices because in many cases multiple IoT devices may be connected to each other. In some wireless communications systems, information in one layer, such as layer 3 (L3), may be encrypted, while information generated in a different layer, such as a layer below L3 (e.g., a physical layer (PHY), a media access control (MAC), etc.) may be transmitted between devices without this information being encrypted.

The present techniques secure information generated below one layer, such as L3 (e.g., PHY/MAC-generated transmissions), to ensure that at least some if not all transmissions of wireless communications systems are secure. In some cases, the techniques include securing multiplexed transmissions. When two physical uplink channels overlapping at least partially in time are multiplexed, a key, such as a secret key, may be derived to encrypt the multiplexed information. The present techniques include various options to derive the key, such as the secret key. To encrypt information at one layer (e.g., the PHY layer) the key (e.g., a secret key) may be generated by a second key provided to layer (e.g., the PHY layer) from another layer (e.g., an upper layer). In some cases, a set of parameters, such as PHY parameters (e.g., leveraging randomness between transmitter and receiver) may be used to encrypt information at the layer (e.g., the PHY layer). In some cases, a source of randomness (e.g., randomness, pseudo-randomness) may be injected into the layer transmissions (e.g., PHY layer transmissions) to confuse a potential eavesdropper.

In some cases, a UE may select a first secure physical uplink channel and a second secure physical uplink channel for multiplexing when the first secure physical uplink channel and second secure physical uplink channel overlap (e.g., overlap at least partially) in the time domain. In some cases, the UE may generate a key, such as a secret key, based on the UE selecting the first secure physical uplink channel and the second secure physical uplink channel for multiplexing. In some cases, the UE may generate multiplexed information when the UE multiplexes the first secure physical uplink channel and the second secure physical uplink channel. In some cases, the UE may encrypt the multiplexed information based on the secret key generated by the UE. In some cases, the first secure physical uplink channel being secure indicates the first physical uplink channel is secured by a first secret key. In some cases, the second secure physical uplink channel being secure indicates the second physical uplink channel is secured with a second secret key.

Aspects of the subject matter described herein may be implemented to realize one or more advantages. The described techniques may support improvements in system security such that a device may prevent potential eavesdroppers from intercepting information from transmissions that the device transmits. Additionally, described techniques may result in protecting wireless communications systems, preventing access to data of such systems and networks, protecting access to or control of devices of the wireless communications systems, preventing data loss and data leakage, or preventing access to related data communication networks, among other advantages.

Aspects of the disclosure are initially described in the context of wireless communications systems. Aspects of the disclosure are further illustrated by and described with reference to environments that relate to multiplexing secure physical uplink channels. Aspects of the disclosure are further illustrated by and described with reference to apparatus diagrams, system diagrams, and flowcharts that relate to multiplexing secure physical uplink channels FIG. 1 illustrates an example of a wireless communications system 100 that supports multiplexing secure physical uplink channels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 may select a first secure physical uplink channel and a second secure physical uplink channel for multiplexing based on the first secure physical uplink channel and second secure physical uplink channel overlapping (e.g., overlapping in time). In some cases, the UE 115 may generate a secret key based on the first secure physical uplink channel and the second secure physical uplink channel being selected for multiplexing. In some cases, the UE 115 may generate multiplexed information when the UE multiplexes the first secure physical uplink channel and the second secure physical uplink channel. In some cases, the UE 115 may encrypt the multiplexed information based on the secret key generated by the UE.

Figure 2:
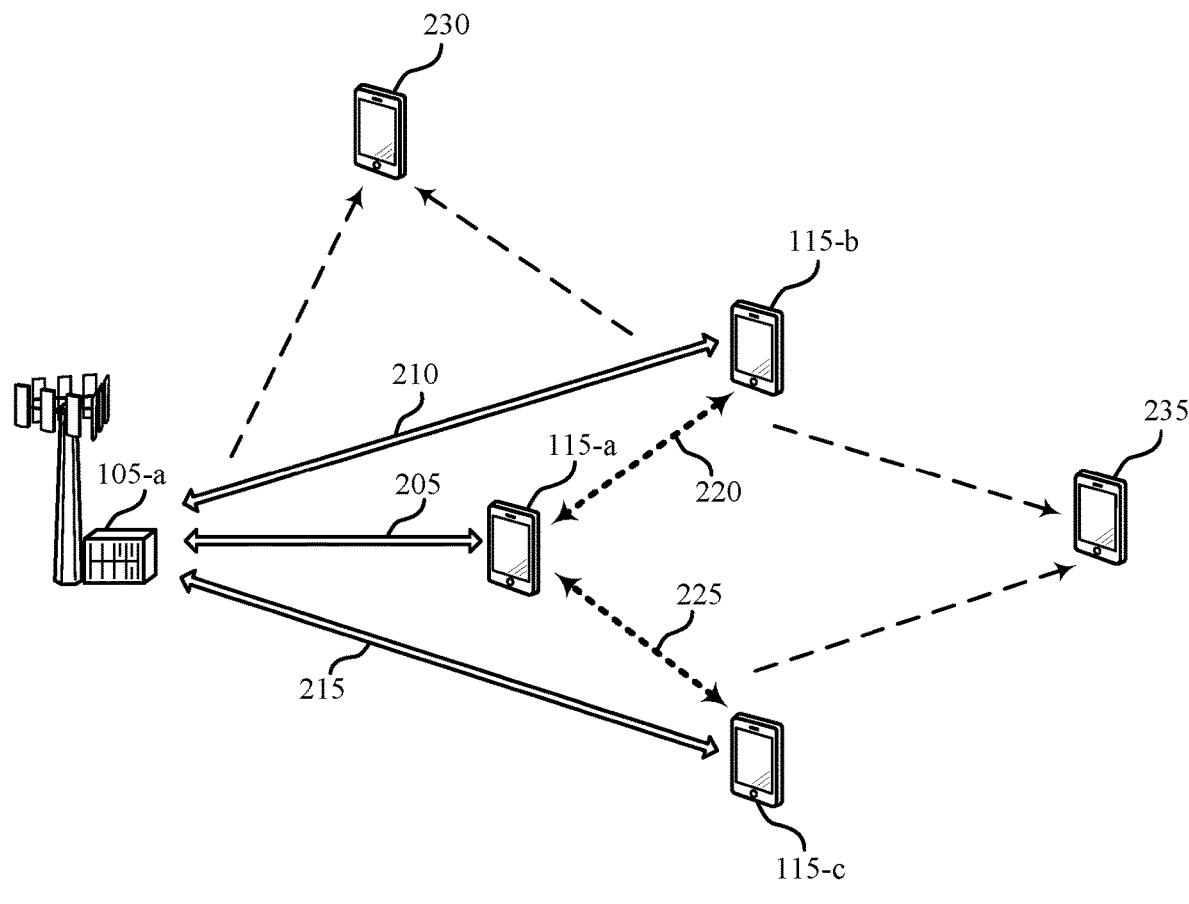
FIG. 2 illustrates an example of a wireless communications system that supports multiplexing secure physical uplink channels in accordance with aspects of the present disclosure.

FIG. 2 illustrates an example of a wireless communications system 200 that supports multiplexing secure physical uplink channels in accordance with aspects of the present disclosure.

As illustrated, wireless communications system 200 may include UE 115-*a*, UE 115-*b*, UE 115-*c*, and base station 105-*a*, any of which may be an example of a UE 115 or a base station 105, respectively, as described herein with reference to FIG. 1. Wireless communications system 200 may also include a direct link 205 between base station 105-*a* and UE 115-*a*, a direct link 210 between base station 105-*a* and UE 115-*b*, and a direct link 215 between base station 105-*a* and UE 115-*c*. Wireless communications system 200 may also include a sidelink 220 between UE 115-*a* and UE 115-*b* and a sidelink 225 between UE 115-*a* and UE 115-*c*. In some examples, direct link 205, direct link 210, and direct link 215 may each include a downlink and an uplink. In some examples, base station 105-*a* may use the downlink of direct link 205 to convey control and/or data information to UE 115-*a*. And UE 115-*a* may use the uplink of direct link 205 to convey control and/or data information to base station 105-*a*. In some cases, the downlink of direct link 205 may use different time and/or frequency resources than the uplink of direct link 205. In some cases, UE 115-*a* may use sidelink 220 to convey control and/or data information (e.g., a sidelink message) to UE 115-*b*, while UE 115-*b* may use sidelink 220 to convey control and/or data information to UE 115-*a*. In some cases, UE 115-*a* may use sidelink 225 to convey control and/or data information to UE 115-*c*, while UE 115-*c* may use sidelink 225 to convey control and/or data information to UE 115-*a*. In some cases, UE 115-*a* may use sidelink 220 to convey sidelink feedback information (e.g., ACK/NACK) to UE 115-*b*, while UE 115-*b* may use sidelink 220 to convey sidelink feedback information to UE 115-*a*. In some cases, UE 115-*a* may use sidelink 225 to convey sidelink feedback information to UE 115-*c*, while UE 115-*c* may use sidelink 225 to convey sidelink feedback information to UE 115-*a*.

In the illustrated example, a potential eavesdropper 230 may be positioned to intercept communications (e.g., unencrypted communications, unsecure communications) between base station 105-*a* and UE 115-*b* over direct link 210. Additionally, or alternatively, potential eavesdropper 235 may be positioned to intercept communications between UE 115-a and UE 115-b over sidelink 220 or intercept communications between UE 115-b and UE 115-c over sidelink 225, or both.

In some examples, UE 115-b may support multiplexing physical uplink channels to prevent potential eavesdropper 230 and potential eavesdropper 235 from intercepting transmissions transmitted by UE 115-b. In some cases, UE 115-a, UE 115-c, or base station 105-a may support multiplexing physical uplink channels. In some cases, UE 115-a, UE 115-c, or base station 105-a, or any combination thereof, may perform one or more operations performed by UE 115-b as described herein.

In some examples, UE 115-b may select a first secure physical uplink channel and a second secure physical uplink channel for multiplexing based on the first secure physical uplink channel and second secure physical uplink channel overlapping. In some cases, UE 115-b may determine that first secure physical uplink channel and second secure physical uplink channel overlap in time, and then select first secure physical uplink channel and second secure physical uplink channel based on this determination. In some cases, UE 115-b may generate a secret key (e.g., secret cryptographic key) based on UE 115-b selecting the first secure physical uplink channel and the second secure physical uplink channel for multiplexing. In some cases, UE 115-b may generate multiplexed information when UE 115-b multiplexes the first secure physical uplink channel and the second secure physical uplink channel, where the multiplexed information includes the first secure physical uplink channel multiplexed with the second secure physical uplink channel. In some cases, UE 115-b may encrypt the multiplexed information based on the secret key UE 115-b generates. In some cases, UE 115-b may transmit the encrypted multiplexed information on a resource associated with the first secure physical uplink channel or a resource associated with the second secure physical uplink channel.

In some examples, UE 115-b may use a first physical channel key associated with the first secure physical uplink channel and a second physical channel key associated with the second secure physical uplink channel to generate the secret key, where the first physical channel key and the second physical channel key are cryptographic keys. In some cases, UE 115-b may generate the secret key based on a security state of an existing cryptographic key or encryption key. In some cases, UE 115-b may generate the secret key based on a security state of a first key compared to a security state of a second key. In some cases, UE 115-b may determine a security state of the first physical channel key associated with the first secure physical uplink channel exceeds a security state of the second physical channel key associated with the second secure physical uplink channel. In some cases, UE 115-b may use a copy of the first physical channel key as the secret key or as a basis of generating the secret key based on the security state of the first physical channel key exceeding the security state of a second physical channel key.

In some examples, UE 115-b may determine the security state of the first physical channel key matches the security state of the second physical channel key. When the respective security states match, UE 115-b may determine whether one physical uplink channel has a higher priority (e.g., a first physical uplink channel for ultra-reliable low-latency communication) than another physical uplink channel (e.g., a second physical uplink channel for enhanced mobile broadband). In some cases, UE 115-b may determine the first secure physical uplink channel is associated with a higher priority than the second secure physical uplink channel based on UE 115-b determining the respective security states match. In some cases, UE 115-b may use a copy of the first physical channel key as the secret key based on the first secure physical uplink channel being associated with the higher priority than the second secure physical uplink channel.

In some examples, UE 115-b may determine the first secure physical uplink channel is associated with a higher priority than the second secure physical uplink channel and use a copy of the first physical channel key as the secret key based on the first secure physical uplink channel being associated with the higher priority in relation to the second secure physical uplink channel (e.g., independent of the security states of the respective physical uplink channels).

In some examples, UE 115-b may derive a new cryptographic key based on passing one or more existing cryptographic keys through a key derivation function, where an output of the key derivation function is the new cryptographic key. In some cases, UE 115-b may derive the new cryptographic key based on passing the first physical channel key or the second physical channel key, or both, through the key derivation function.

In some examples, UE 115-b may receive a security configuration from base station 105-a (e.g., via direct link 210 or sidelink 220). In some cases, the security configuration may indicate which physical channel key for UE 115-b to use (e.g., indicates to use the first physical channel key or the second physical channel key). In some cases, UE 115-b may use a copy of the first physical channel key as the secret key based on the security configuration.

In some examples, a first binary value (e.g., 0 or 1) in the security configuration may indicate to use the physical channel key associated with the lower priority channel between the first secure physical uplink channel and the second secure physical uplink channel. In some cases, a second binary value (e.g., 1 or 0) in the security configuration may indicate to use the physical channel key associated with the higher priority channel between the first secure physical uplink channel and the second secure physical uplink channel. In some cases, the first binary value may indicate to transmit the multiplexed physical uplink channels on resources of the lower priority channel. In some cases, the second binary value may indicate to transmit the multiplexed physical uplink channels on resources of the higher priority channel.

In some examples, the security configuration may include a bitmap or a key derivation function associated with generating cryptographic keys. In some cases, the security configuration may indicate to use at least a portion of the first physical channel key or at least a portion of the second physical channel key, or at least portions of each, with the bitmap or the key derivation function to generate the secret key. In some cases, the security configuration may be received in a downlink control information DCI), radio resource control (RRC), or media access control (MAC) control element (MAC-CE), or any combination thereof.

In some examples, UE 115-b may determine a first security state of the first physical channel key and a second security state of the second physical channel key. In some cases, UE 115-b may determine whether the first security state or the second security state, or both, satisfy (e.g., exceeds, or meets or exceeds) a security threshold. In some cases, UE 115-b may generate the secret key based on whether the first security state or the second security state, or both, satisfy the security threshold. In some cases, UE 115-b may generate the secret key when neither the first security state nor the second security state satisfies the security threshold. In some cases, UE 115-b may generate the secret key when either the first security state or the second security state fail to satisfy the security threshold. In some cases, UE 115-b may bypass generating the secret key when both the first security state and the second security state satisfy the security threshold. In some cases, UE 115-b may generate the secret key based on the physical channel key with the highest security state. When the first security state exceeds the second security state, UE 115-b may use the first physical channel key (e.g., a copy of the first physical channel key) as the secret key, or generate the secret key from the first physical channel key.

In some examples, UE 115-b may track a quality of the secret key based on a security degradation function. In some cases, UE 115-b may generate a second secret key to replace the secret key when the tracked quality of the secret key does not satisfy a quality threshold. In some cases, the security degradation function computes the quality of the secret key based on a dividend value, an addend value, and a usage number that indicates a number of times the secret key has been used. In some cases, the dividend value, the addend value, or the security degradation function, or any combination thereof, may be defined in the security configuration. In some cases, UE 115-b may indicate to base station 105-a an acknowledgement that UE 115-b has used, is using, or will use the security degradation function to track the quality of the secret key. In some cases, UE 115-b may compute the security degradation function each time the secret key is used.

In some examples, UE 115-b may track a quality of the secret key based on a security degradation timer. In some cases, the security degradation timer may be defined in the security configuration. In some cases, the security degradation timer may increase or decrease over time. In some cases, the security degradation timer may be configured to indicate a degradation of the quality of the secret key over a passage of time.

The described techniques may support improvements in system security such that a device may prevent potential eavesdroppers from intercepting information from transmissions that the device transmits. Additionally, described techniques may result in protecting wireless communications systems, preventing access to data of such systems and networks, protecting access to or control of devices of the wireless communications systems, preventing data loss and data leakage, preventing access to related data communication networks, etc.

Figure 3:
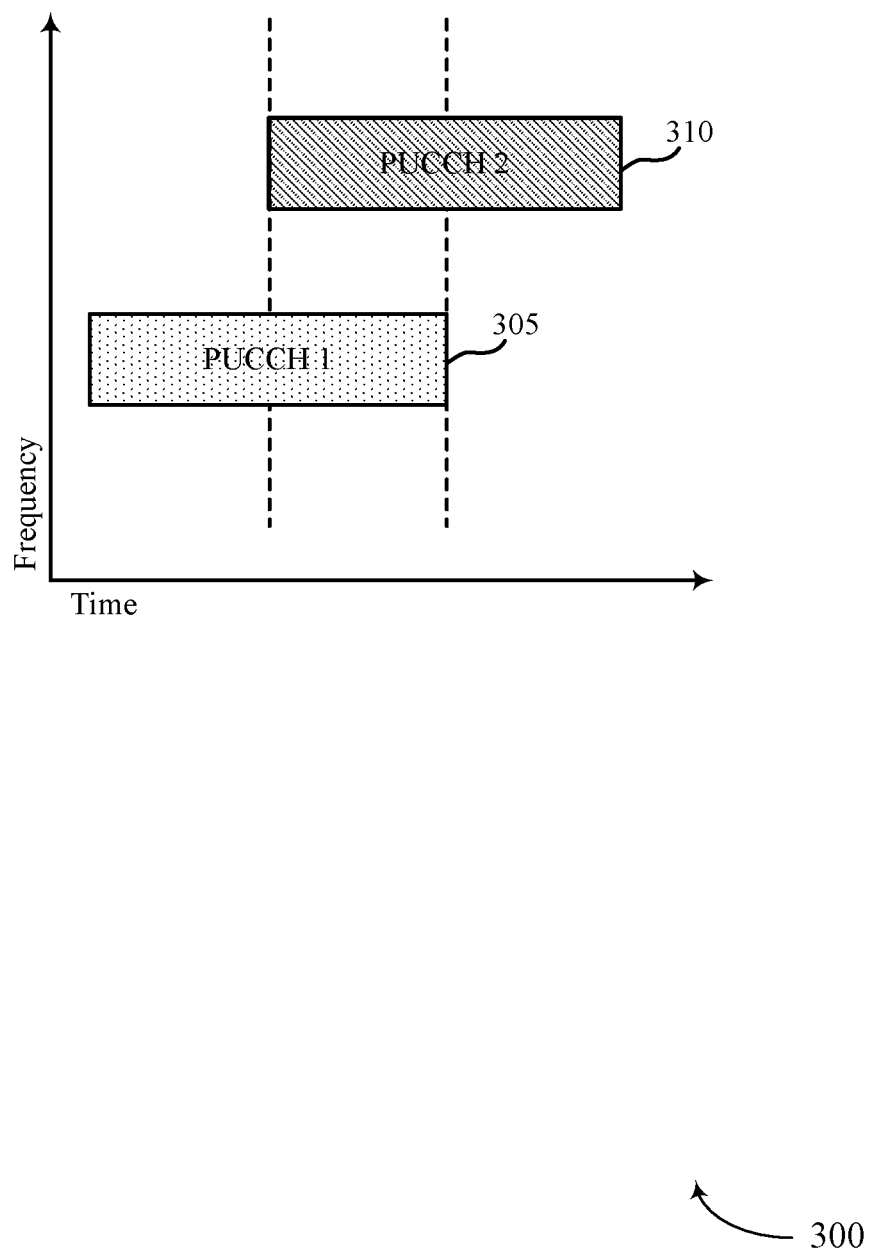
FIG. 3 illustrates an example of an environment that supports multiplexing secure physical uplink channels in accordance with aspects of the present disclosure.

FIG. 3 illustrates an example of an environment 300 that supports multiplexing secure physical uplink channels in accordance with aspects of the present disclosure.

In the illustrated example, environment 300 includes a first physical uplink channel 305 (e.g., a first secure physical uplink channel) overlapping a second physical uplink channel 310 (e.g., a second secure physical uplink channel) in the time domain.

In some cases, first physical uplink channel 305 and second physical uplink channel 310 may be associated with a security configuration. In some cases, the security configuration may stipulate one or more constraints regarding the security of first physical uplink channel 305 and second physical uplink channel 310. In some cases, the security configuration may include one or more constraints in relation to a UE (e.g., a UE 115 of FIG. 1 or FIG. 2) multiplexing first physical uplink channel 305 with second physical uplink channel 310 based on first physical uplink channel 305 overlapping second physical uplink channel 310 in the time domain.

When the UE multiplexes first physical uplink channel 305 with second physical uplink channel 310, the UE may derive a secret key to encrypt the multiplexed channels. In some cases, first physical uplink channel 305 may be associated with a first key that enables the UE to transmit information securely over the first physical uplink channel 305, and second physical uplink channel 310 may be associated with a second key that enables the UE to transmit information securely over the second physical uplink channel 310. In some cases, the first key may be more secure than the second key (or vice versa) based on the respective key generation schemes used for each key, or based on the times that each respective key has been used, or the time since each respective key was generated, or any combination thereof.

In some examples, the UE may use a key derivation function to generate the first key, the second key, or the secret key, or any combination thereof. In some cases, the security configuration may indicate, based on one or more circumstances indicated in the security configuration, which physical channel key to use between the first key, the second key, and generating a secret key, when first physical uplink channel 305 is multiplexed with second physical uplink channel 310.

In some examples, one physical channel (e.g., second physical uplink channel 310) may have more stringent security constraints than another physical channel (e.g., first physical uplink channel 305). In some cases, the security configuration may stipulate that a physical uplink control channel carrying a hybrid automatic repeat request acknowledgement (e.g., first physical uplink channel 305) is to be more secure (e.g., use a more secure key) than a physical uplink control channel carrying channel state information (e.g., second physical uplink channel 310). In some cases, the security configuration may stipulate that a high priority physical uplink control channel (e.g., second physical uplink channel 310 carrying ultra-reliable low-latency communication) is to be configured more securely than a low priority physical uplink control channel_(e.g., first physical uplink channel 305 carrying enhanced mobile broadband). In some cases, the security constraints of the security configuration may depend on a robustness of a key generated to secure first physical uplink channel 305 or second physical uplink channel 310, or both (e.g., a key generated to secure first physical uplink channel 305 multiplexed with second physical uplink channel 310).

Figure 4:
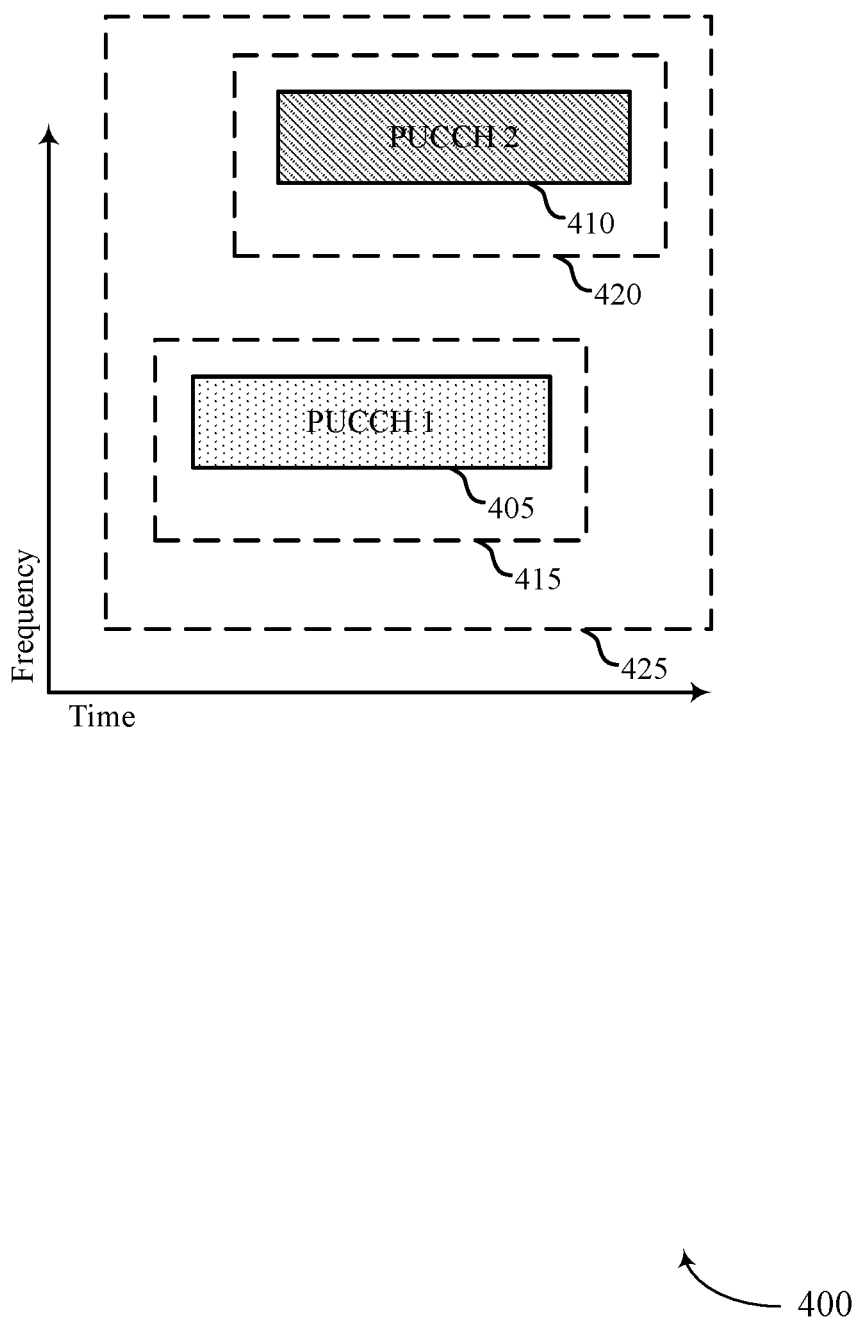
FIG. 4 illustrates an example of an environment that supports multiplexing secure physical uplink channels in accordance with aspects of the present disclosure.

FIG. 4 illustrates an example of an environment 400 that supports multiplexing secure physical uplink channels in accordance with aspects of the present disclosure.

In the illustrated example, environment 400 includes a first physical uplink channel 405 (e.g., a first secure physical uplink channel) overlapping a second physical uplink channel 410 (e.g., a second secure physical uplink channel) in the time domain. As shown, first physical uplink channel 405 may be secured by first physical channel key 415, and second physical uplink channel 410 may be secured by second physical channel key 420. In some cases, a UE may multiplex first physical uplink channel 405 with second physical uplink channel 410 based on first physical uplink channel 405 overlapping second physical uplink channel 410 in the time domain. In some cases, the UE may use a secret key to secure first physical uplink channel 405 multiplexed with second physical uplink channel 410. In some cases, an upper layer may provide the first physical channel key 415 or the second physical channel key 420, or both, to a physical layer associated with first physical uplink channel 405 and second physical uplink channel 410.

In some examples, first physical uplink channel 405 may be secured by a first set of physical channel parameters and second physical uplink channel 410 may be secured by a second set of physical channel parameters different from the first set of physical channel parameters. In some cases, the first set of physical channel parameters may include one or more first random timing values associated with a transmitter or a receiver, or both, of first physical uplink channel 405. In some cases, the second set of physical channel parameters may include one or more second random timing values associated with a transmitter or a receiver, or both, of second physical uplink channel 410. In some cases, the first random timing values or the second random timing values, or both, may be based on a time stamp of a transmission, a time stamp of a reception, a period of time between a transmission and a reception, a period of time between a reception and a transmission, a period of time between a first transmission and a second transmission, or a period of time between a first reception and a second reception, or any combination thereof.

In some examples, first physical channel key 415 may be more secure than second physical channel key 420 based on stronger secret key generation schemes being used on first physical channel key 415 or the number of times each key has been used, or both. In some cases, a UE may track the quality of first physical channel key 415 and second physical channel key 420 based on a degradation rate or based on an associated timer configured to track a respective key, or both. In some cases, the security degradation function may be agreed upon between a UE and a base station. In some cases, the security degradation function may be applied each time a key is used. In some cases, the security degradation function may take the age of a key and a number of times a key has been used into account. In some cases, the security degradation function may compute the quality of a secret key based on a dividend value, an addend value, and a usage number that indicates a number of times the secret key has been used. In some cases, the security degradation function may track a secret-key adjustment rate (SK_AR) as follows:

$$SK\_AR(a, b) = \frac{\alpha}{\# \text{ usage}} + b,$$

where α (dividend) and b (addend) are predefined or values defined in the security configuration (e.g., signaled in DCI, RRC, or MAC-CE, or any combination thereof). In some cases, secret-key adjustment rate (SK_AR) may be computed as follows: SK_AR(a,b)=α(#usage)+b, where b remains an addend, but α and the usage number (e.g., #usage) are factors of a product that is summed with b. In some cases, the security degradation function may be defined in the security configuration.

In some cases, a UE may track the quality of first physical channel key 415 and second physical channel key 420 based on a timer configured to track a quality of first physical channel key 415 or second physical channel key 420, or both. In some cases, may use a first timer to track the quality of first physical channel key 415, and use a second timer to track the quality of second physical channel key 420. In some cases, the UE may generate a new key and replace first physical channel key 415 with the new key when the first timer expires or when the first timer reaches some preset time.

In some examples, a UE may multiplex first physical uplink channel 405 with second physical uplink channel 410 based on first physical uplink channel 405 overlapping second physical uplink channel 410 in the time domain, as shown. In some cases, the UE may derive a secret key and use the secret key to encrypt the multiplexed physical uplink channels. In the illustrated example, first physical uplink channel 405 may be secured by first physical channel key 415, and second physical uplink channel 410 may be secured by second physical channel key 420 before the UE multiplexes first physical uplink channel 405 with second physical uplink channel 410. In some cases, at the time of multiplexing (e.g., start of a slot where the multiplex is configured to occur) the UE may determine the degradation rate of each key (e.g., first physical channel key 415 and second physical channel key 420) and determine which of the two keys is more secure. For first physical channel key 415 and second physical channel key 420, respectively, the resulting security states may be low security and high security, low security and low security, high security and low security, or high security and high security. In some cases, when the security states of first physical channel key 415 satisfies a security state threshold, the security state of first physical channel key 415 may be high security, and low security otherwise. When the security states of second physical channel key 420 satisfies a security state threshold, the security state of second physical channel key 420 may be high security, and low security otherwise. In some cases, the UE may determine which of the two keys is more secure, and then tag the more secure key (e.g., second physical channel key 420) as high security and tag the other key (e.g., first physical channel key 415) as low security. In some cases, the UE may use the high security key (e.g., first physical channel key 415 or second physical channel key 420) to encrypt the multiplexed channels (e.g., first physical uplink channel 405 and second physical uplink channel 410).

In some examples, first physical uplink channel 405 multiplexed with second physical uplink channel 410 may be referred to as multiplexed information or a multiplexed channel. In some cases, the secret key used to encrypt the multiplexed information may be derived in a number of ways.

In some examples, the UE may use the key of each channel to secure the multiplexed information. After encrypting the multiplexed information, the UE may transmit the secured multiplexed information using the resources associated with first physical uplink channel 405 or the resources associated with second physical uplink channel 410.

In some examples, the UE may use first physical channel key 415 to encrypt first physical uplink channel 405 (e.g., first uplink control information), use second physical channel key 420 to encrypt second physical uplink channel 410 (e.g., second uplink control information), then multiplex first physical uplink channel 405 secured by first physical channel key 415 with second physical uplink channel 410 secured by second physical channel key 420.

In some examples, the UE may multiplex first physical uplink channel 405 and second physical uplink channel 410, and use the key with the highest security state (e.g., first physical channel key 415 or second physical channel key 420) to secure the multiplexed information. When both keys have the same security state, the UE may use the key corresponding to the channel (e.g., first physical uplink channel 405 or second physical uplink channel 410) with the higher priority.

In some examples, the UE may multiplex first physical uplink channel 405 and second physical uplink channel 410, and use the key corresponding to the channel (e.g., first physical uplink channel 405 or second physical uplink channel 410) with the higher priority (e.g., independent of the security state of each key). In some cases, first physical uplink channel 405 may be associated with first uplink control information with a high priority and second physical uplink channel 410 may be associated with second uplink control information with a low priority. Based on the respectively higher priority, the UE may multiplex both channels on resources of the first uplink control information using the key associated with the first uplink control information (e.g., first physical channel key 415) to encrypt the multiplexed channel.

In some examples, the UE may use a deterministic pattern or function to deduce (e.g., via a key derivation function) a new key as a function of two keys (e.g., first physical channel key 415 and second physical channel key 420 are inputs of the key derivation function). The UE may then use the new key (e.g., output of the key derivation function) directly (e.g., when the secret-key size is greater than or equal to the multiplex data payload size) or as a seed to generate a longer secret key (e.g., when the secret-key size is less than the multiplex data payload size) to secure the multiplexed information.

In some examples, the UE may use a key indicated by the base station. In some cases, the security configuration may indicate which key to use (e.g., first physical channel key 415 or second physical channel key 420). In some cases, the security configuration may indicate which key to use when a conflict occurs (e.g., the security state of first physical channel key 415 matches the security state of second physical channel key 420, both first physical uplink channel 405 and second physical uplink channel 410 are high priority, etc.). In some cases, this indication may be communicated via DCI, RRC, or MAC-CE, or any combination thereof. In some cases, a first binary value (e.g., 0 or 1) in the security configuration may indicate to use the physical channel key associated with a lower priority channel (e.g., first physical uplink channel 405 or second physical uplink channel 410). In some cases, a second binary value (e.g., 1 or 0) in the security configuration may indicate to use the physical channel key associated with the higher priority channel (e.g., first physical uplink channel 405 or second physical uplink channel 410). In some cases, the base station may indicate (e.g., via DCI, RRC, or MAC-CE, or any combination thereof) a bitmap or a function for which part of each key may be used (e.g., at least a portion of first physical channel key 415 and/or at least a portion of second physical channel key 420) in case of a conflict.

Figure 5:
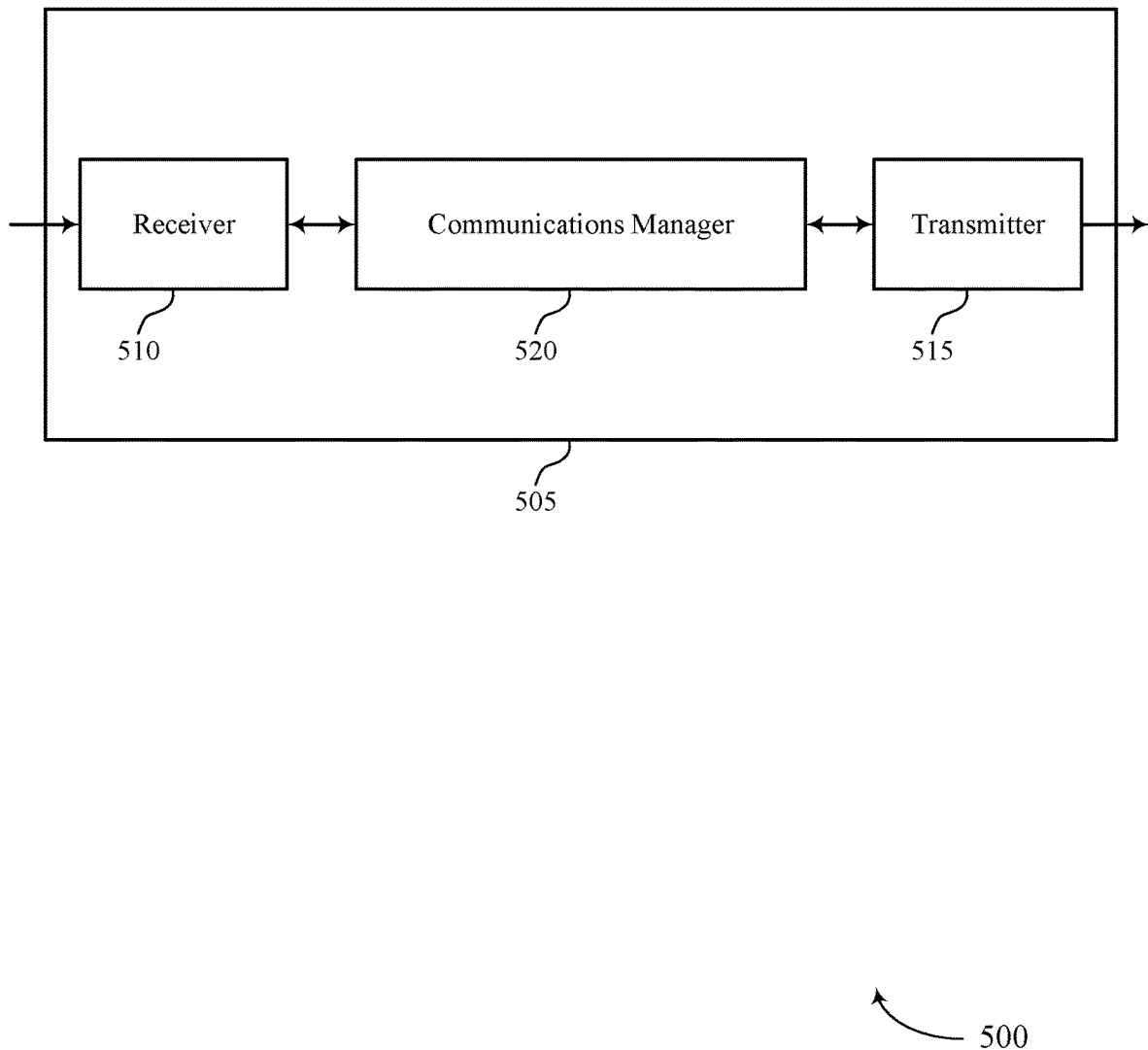
FIGS. 5 and 6 show block diagrams of devices that support multiplexing secure physical uplink channels in accordance with aspects of the present disclosure.

FIG. 5 shows a block diagram 500 of a device 505 that supports multiplexing secure physical uplink channels in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multiplexing secure physical uplink channels). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiplexing secure physical uplink channels). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multiplexing secure physical uplink channels as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication in accordance with examples as disclosed herein. For example, the communications manager 520 may be configured as or otherwise support a means for selecting a first secure physical uplink channel and a second secure physical uplink channel for multiplexing based on the first secure physical uplink channel and second secure physical uplink channel overlapping. The communications manager 520 may be configured as or otherwise support a means for generating a secret key based on selecting the first secure physical uplink channel and the second secure physical uplink channel for multiplexing in accordance with the first secure physical uplink channel overlapping the second secure physical uplink channel in time. The communications manager 520 may be configured as or otherwise support a means for generating multiplexed information based on multiplexing the first secure physical uplink channel and the second secure physical uplink channel. The communications manager 520 may be configured as or otherwise support a means for encrypting the multiplexed information based on the secret key.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for preventing potential eavesdroppers from intercepting information from transmissions that the device transmits. Additionally, described techniques may result in protecting wireless communications systems, preventing access to data of such systems and networks, protecting access to or control of devices of the wireless communications systems, preventing data loss and data leakage, preventing access to related data communication networks, etc.

Figure 6:
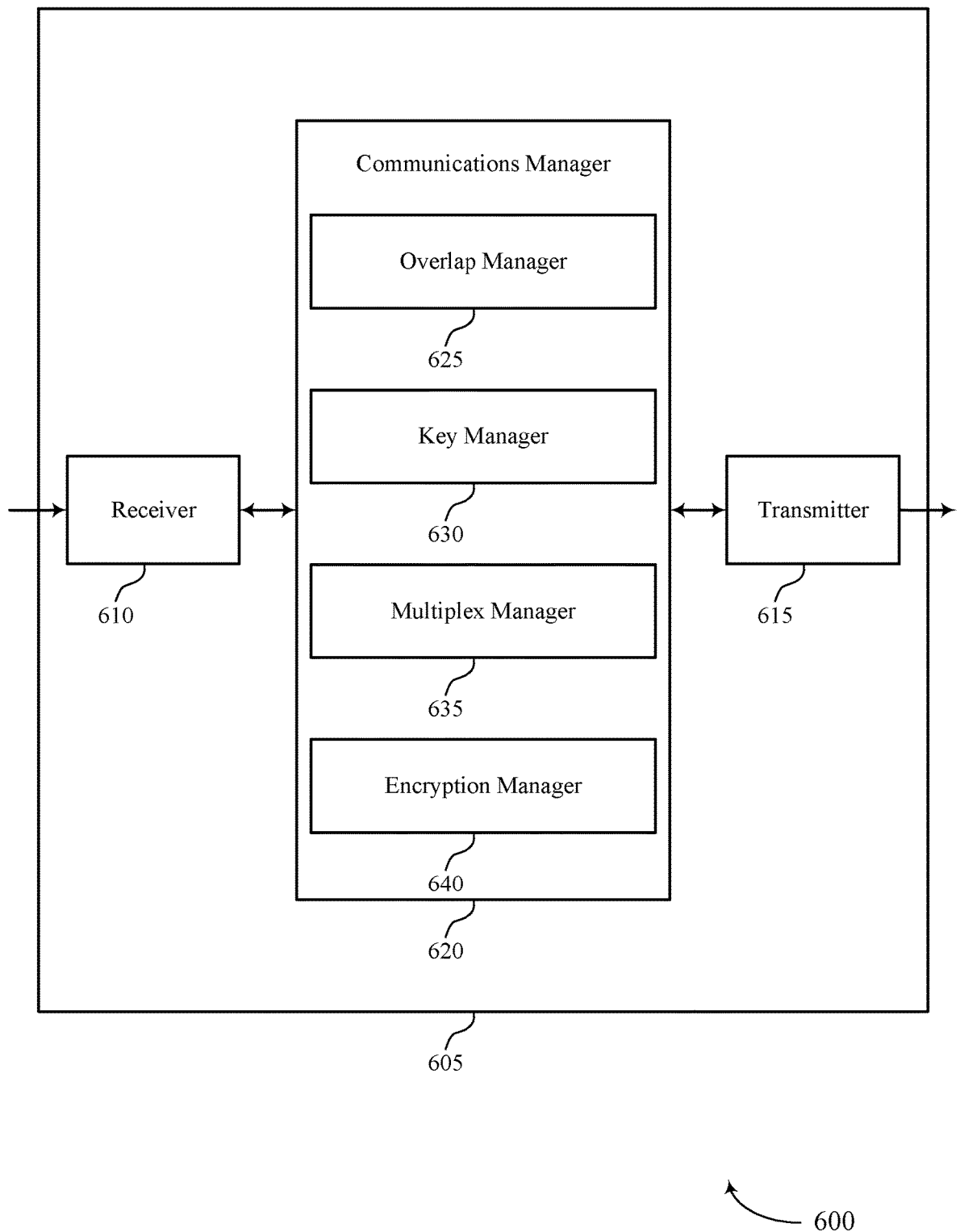

FIG. 6 shows a block diagram 600 of a device 605 that supports multiplexing secure physical uplink channels in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiplexing secure physical uplink channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiplexing secure physical uplink channels). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multiplexing secure physical uplink channels as described herein. For example, the communications manager 620 may include an overlap manager 625, a key manager 630, a multiplex manager 635, an encryption manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. The overlap manager 625 may be configured as or otherwise support a means for selecting a first secure physical uplink channel and a second secure physical uplink channel for multiplexing based on the first secure physical uplink channel and second secure physical uplink channel overlapping. The key manager 630 may be configured as or otherwise support a means for generating a secret key based on selecting the first secure physical uplink channel and the second secure physical uplink channel for multiplexing in accordance with the first secure physical uplink channel overlapping the second secure physical uplink channel in time. The multiplex manager 635 may be configured as or otherwise support a means for generating multiplexed information based on multiplexing the first secure physical uplink channel and the second secure physical uplink channel. The encryption manager 640 may be configured as or otherwise support a means for encrypting the multiplexed information based on the secret key.

Figure 7:
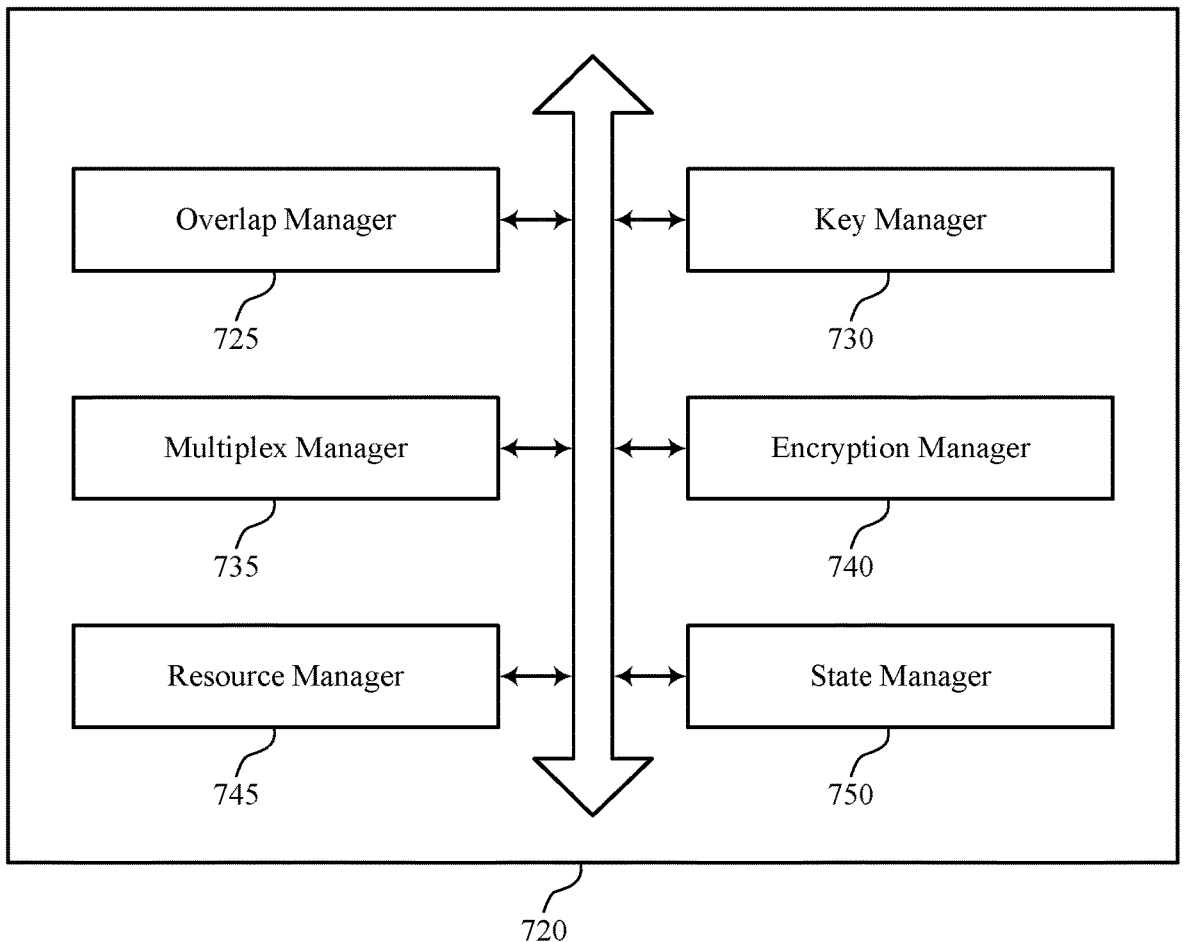
FIG. 7 shows a block diagram of a communications manager that supports multiplexing secure physical uplink channels in accordance with aspects of the present disclosure.

FIG. 7 shows a block diagram 700 of a communications manager 720 that supports multiplexing secure physical uplink channels in accordance with aspects of the present disclosure. The communications manager 720 may be an example of aspects of a communications manager 520, a communications manager 620, or both, as described herein. The communications manager 720, or various components thereof, may be an example of means for performing various aspects of multiplexing secure physical uplink channels as described herein. For example, the communications manager 720 may include an overlap manager 725, a key manager 730, a multiplex manager 735, an encryption manager 740, a resource manager 745, a state manager 750, or any combination thereof. Each of these components may communicate, directly or indirectly, with one another (e.g., via one or more buses).

The communications manager 720 may support wireless communication in accordance with examples as disclosed herein. The overlap manager 725 may be configured as or otherwise support a means for selecting a first secure physical uplink channel and a second secure physical uplink channel for multiplexing based on the first secure physical uplink channel and second secure physical uplink channel overlapping. The key manager 730 may be configured as or otherwise support a means for generating a secret key based on selecting the first secure physical uplink channel and the second secure physical uplink channel for multiplexing in accordance with the first secure physical uplink channel overlapping the second secure physical uplink channel in time. The multiplex manager 735 may be configured as or otherwise support a means for generating multiplexed information based on multiplexing the first secure physical uplink channel and the second secure physical uplink channel. The encryption manager 740 may be configured as or otherwise support a means for encrypting the multiplexed information based on the secret key.

In some examples, the resource manager 745 may be configured as or otherwise support a means for transmitting the encrypted multiplexed information on a resource associated with the first secure physical uplink channel or a resource associated with the second secure physical uplink channel.

In some examples, to support generating the secret key, the key manager 730 may be configured as or otherwise support a means for using a first physical channel key associated with the first secure physical uplink channel and a second physical channel key associated with the second secure physical uplink channel to generate the secret key.

In some examples, to support generating the secret key, the state manager 750 may be configured as or otherwise support a means for determining a security state of a first physical channel key associated with the first secure physical uplink channel exceeds a security state of a second physical channel key associated with the second secure physical uplink channel. In some examples, to support generating the secret key, the state manager 750 may be configured as or otherwise support a means for using a copy of the first physical channel key as the secret key based on the security state of the first physical channel key exceeding the security state of the second physical channel key.

In some examples, to support generating the secret key, the state manager 750 may be configured as or otherwise support a means for determining a security state of a first physical channel key associated with the first secure physical uplink channel matches a security state of a second physical channel key associated with the second secure physical uplink channel. In some examples, to support generating the secret key, the state manager 750 may be configured as or otherwise support a means for determining the first secure physical uplink channel is associated with a higher priority than the second secure physical uplink channel based on the security state of the first physical channel key matching the security state of the second physical channel key. In some examples, to support generating the secret key, the state manager 750 may be configured as or otherwise support a means for using a copy of the first physical channel key as the secret key based on the first secure physical uplink channel being associated with the higher priority than the second secure physical uplink channel.

In some examples, to support generating the secret key, the state manager 750 may be configured as or otherwise support a means for determining that the first secure physical uplink channel is associated with a higher priority than the second secure physical uplink channel. In some examples, to support generating the secret key, the state manager 750 may be configured as or otherwise support a means for using a copy of a first physical channel key associated with the first secure physical uplink channel as the secret key based on the first secure physical uplink channel being associated with the higher priority in relation to the second secure physical uplink channel.

In some examples, to support generating the secret key, the key manager 730 may be configured as or otherwise support a means for deriving a new key based on passing a first physical channel key associated with the first secure physical uplink channel and a second physical channel key associated with the second secure physical uplink channel through a key derivation function, an output of the key derivation function including the new key.

In some examples, the key manager 730 may be configured as or otherwise support a means for receiving, from a base station, a security configuration indicating which physical channel key to use between a first physical channel key associated with the first secure physical uplink channel and a second physical channel key associated with the second secure physical uplink channel.

In some examples, to support generating the secret key, the key manager 730 may be configured as or otherwise support a means for using a copy of the first physical channel key as the secret key based on the security configuration.

In some examples, a first binary value in the security configuration indicates to use a lower priority channel between the first secure physical uplink channel and the second secure physical uplink channel. In some examples, a second binary value in the security configuration indicates to use a higher priority channel between the first secure physical uplink channel and the second secure physical uplink channel.

In some examples, the security configuration includes a bitmap or a key derivation function, the security configuration indicating to use at least a portion of a first physical channel key associated with the first secure physical uplink channel or at least a portion of a second physical channel key associated with the second secure physical uplink channel, or both, with the bitmap or the key derivation function to generate the secret key. In some examples, the security configuration is received in a downlink control information, radio resource control, or media access control control element, or any combination thereof.

In some examples, the state manager 750 may be configured as or otherwise support a means for determining a first security state of a first physical channel key associated with the first secure physical uplink channel and a second security state of a second physical channel key associated with the second secure physical uplink channel. In some examples, the state manager 750 may be configured as or otherwise support a means for determining whether the first security state or the second security state, or both, satisfy a security threshold, where generating the secret key is based on whether the first security state or the second security state, or both, satisfy the security threshold.

In some examples, the key manager 730 may be configured as or otherwise support a means for tracking a quality of the secret key based on a security degradation function. In some examples, the key manager 730 may be configured as or otherwise support a means for generating a second secret key to replace the secret key when the quality of the secret key does not satisfy a quality threshold.

In some examples, the security degradation function computes the quality of the secret key based on a dividend value, an addend value, and a usage number that indicates a number of times the secret key has been used. In some examples, the dividend value, the addend value, or the security degradation function, or any combination thereof, are defined in a security configuration.

In some examples, the key manager 730 may be configured as or otherwise support a means for indicating to a base station an acknowledgement to use the security degradation function to track the quality of the secret key. In some examples, the key manager 730 may be configured as or otherwise support a means for applying the security degradation function each time the secret key is used. In some examples, the key manager 730 may be configured as or otherwise support a means for tracking a quality of the secret key based on a security degradation timer. In some examples, the security degradation timer is defined in a security configuration.

In some examples, the first secure physical uplink channel is secured by a first physical channel key and the second secure physical uplink channel is secured by a second physical channel key. In some examples, an upper layer provides the first physical channel key and the second physical channel key to a physical layer associated with the first secure physical uplink channel and the second secure physical uplink channel.

In some examples, the first secure physical uplink channel is secured by a first set of physical channel parameters and the second secure physical uplink channel is secured by a second set of physical channel parameters. In some examples, the first set of physical channel parameters include one or more first random timing values associated with a transmitter or a receiver, or both, of the first secure physical uplink channel. In some examples, the second set of physical channel parameters include one or more second random timing values associated with a transmitter or a receiver, or both, of the second secure physical uplink channel.

In some examples, the first random timing values or the second random timing values, or both, are based on a time stamp of a transmission, a time stamp of a reception, a period of time between a transmission and a reception, a period of time between a reception and a transmission, a period of time between a first transmission and a second transmission, or a period of time between a first reception and a second reception, or any combination thereof.

Figure 8:
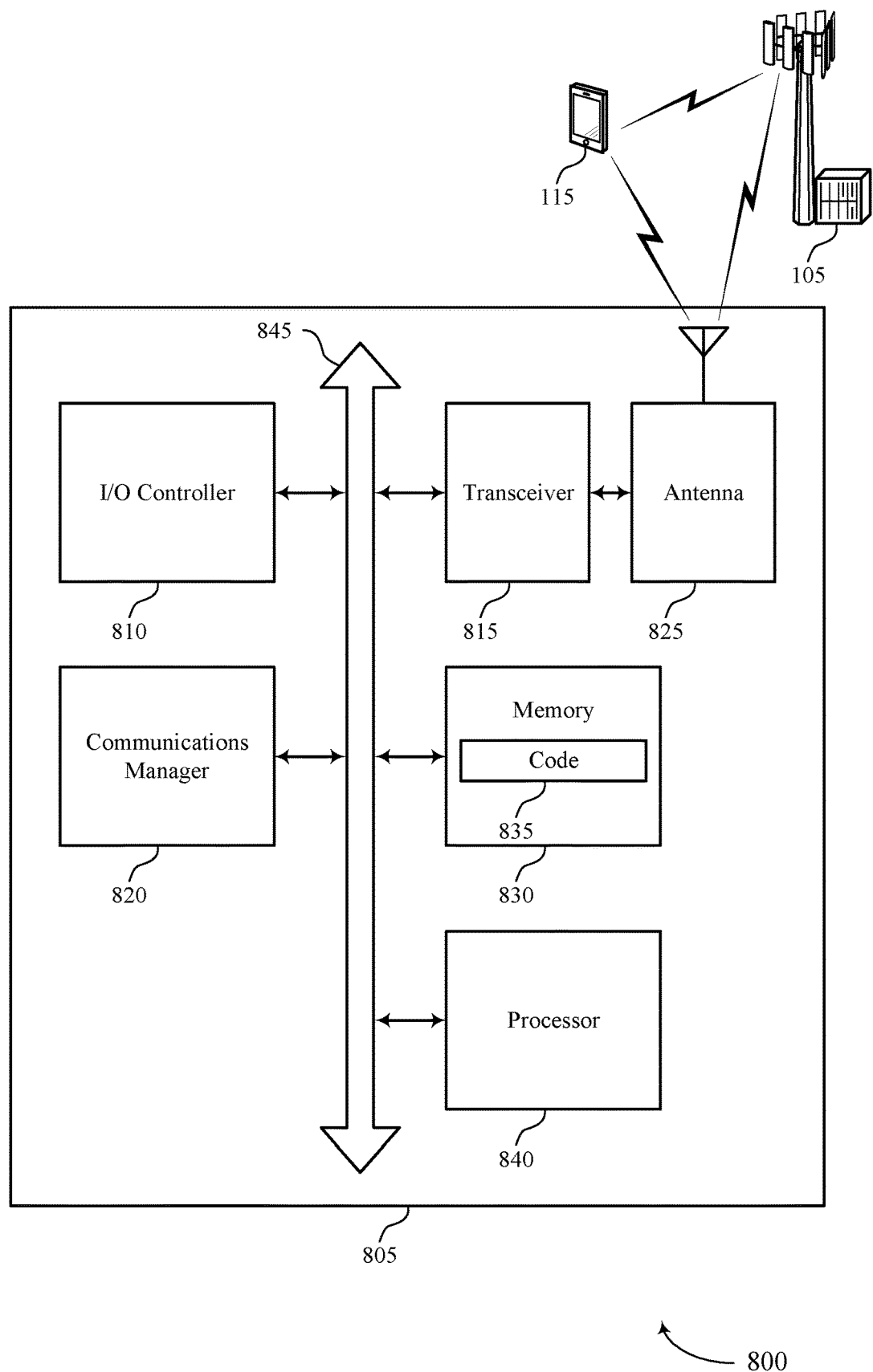
FIG. 8 shows a diagram of a system including a device that supports multiplexing secure physical uplink channels in accordance with aspects of the present disclosure.

FIG. 8 shows a diagram of a system 800 including a device 805 that supports multiplexing secure physical uplink channels in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multiplexing secure physical uplink channels). For example, the device 805 or a component of the device 805 may include a processor 840 and memory 830 coupled to the processor 840, the processor 840 and memory 830 configured to perform various functions described herein.

The communications manager 820 may support wireless communication in accordance with examples as disclosed herein. For example, the communications manager 820 may be configured as or otherwise support a means for selecting a first secure physical uplink channel and a second secure physical uplink channel for multiplexing based on the first secure physical uplink channel and second secure physical uplink channel overlapping. The communications manager 820 may be configured as or otherwise support a means for generating a secret key based on selecting the first secure physical uplink channel and the second secure physical uplink channel for multiplexing in accordance with the first secure physical uplink channel overlapping the second secure physical uplink channel in time. The communications manager 820 may be configured as or otherwise support a means for generating multiplexed information based on multiplexing the first secure physical uplink channel and the second secure physical uplink channel. The communications manager 820 may be configured as or otherwise support a means for encrypting the multiplexed information based on the secret key.

By including or configuring the communications manager 820 in accordance with examples as described herein, the device 805 may support techniques for preventing potential eavesdroppers from intercepting information from transmissions that the device transmits. Additionally, described techniques may result in protecting wireless communications systems, improved communication reliability, improved user experience related to data protection, increased security of communication resources, improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multiplexing secure physical uplink channels as described herein, or the processor 840 and the memory 830 may be otherwise configured to perform or support such operations.

Figure 9:
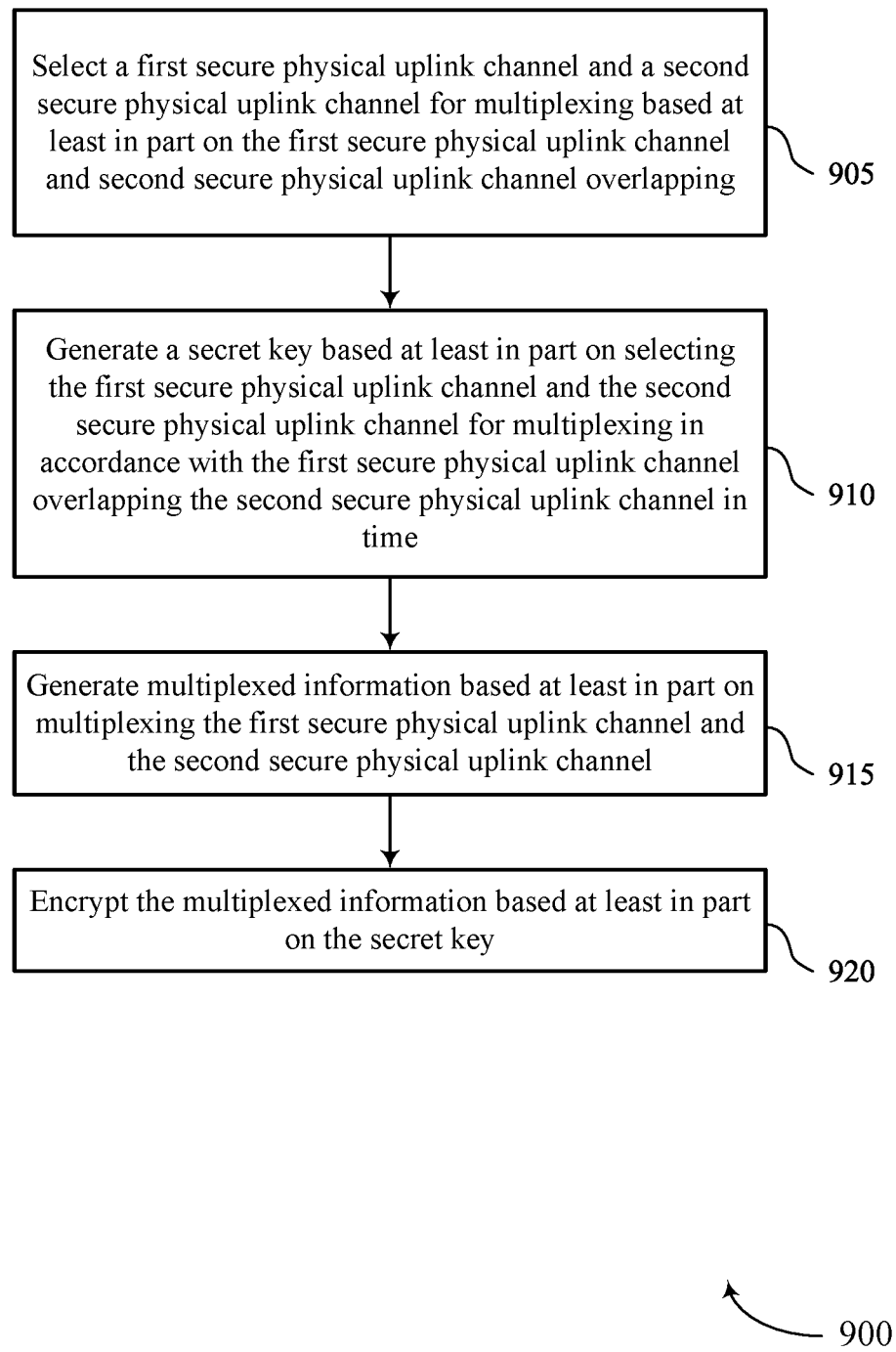
FIGS. 9 and 10 show flowcharts illustrating methods that support multiplexing secure physical uplink channels in accordance with aspects of the present disclosure.

FIG. 9 shows a flowchart illustrating a method 900 that supports multiplexing secure physical uplink channels in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include selecting a first secure physical uplink channel and a second secure physical uplink channel for multiplexing based on the first secure physical uplink channel and second secure physical uplink channel overlapping. The operations of 905 may be performed in accordance with examples as disclosed herein. In some examples, aspects of the operations of 905 may be performed by an overlap manager 725 as described with reference to FIG. 7.

At 910, the method may include generating a secret key based on selecting the first secure physical uplink channel and the second secure physical uplink channel for multiplexing in accordance with the first secure physical uplink channel overlapping the second secure physical uplink channel in time. The operations of 910 may be performed in accordance with examples as disclosed herein. In some examples, aspects of the operations of 910 may be performed by a key manager 730 as described with reference to FIG. 7.

At 915, the method may include generating multiplexed information based on multiplexing the first secure physical uplink channel and the second secure physical uplink channel. The operations of 915 may be performed in accordance with examples as disclosed herein. In some examples, aspects of the operations of 915 may be performed by a multiplex manager 735 as described with reference to FIG. 7.

At 920, the method may include encrypting the multiplexed information based on the secret key. The operations of 920 may be performed in accordance with examples as disclosed herein. In some examples, aspects of the operations of 920 may be performed by an encryption manager 740 as described with reference to FIG. 7.

Figure 10:
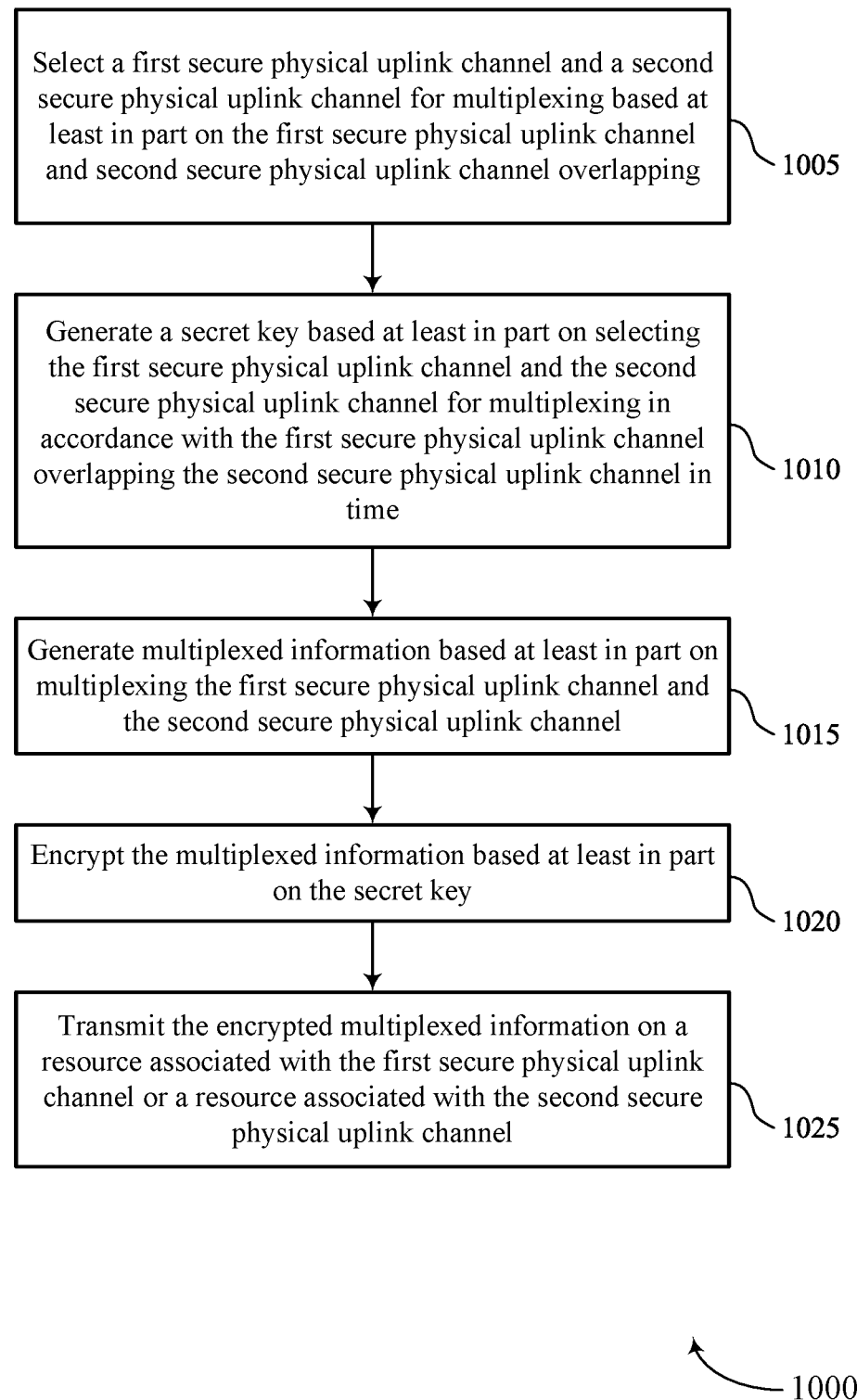

FIG. 10 shows a flowchart illustrating a method 1000 that supports multiplexing secure physical uplink channels in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include selecting a first secure physical uplink channel and a second secure physical uplink channel for multiplexing based on the first secure physical uplink channel and second secure physical uplink channel overlapping. The operations of 1005 may be performed in accordance with examples as disclosed herein. In some examples, aspects of the operations of 1005 may be performed by an overlap manager 725 as described with reference to FIG. 7.

At 1010, the method may include generating a secret key based on selecting the first secure physical uplink channel and the second secure physical uplink channel for multiplexing in accordance with the first secure physical uplink channel overlapping the second secure physical uplink channel in time. The operations of 1010 may be performed in accordance with examples as disclosed herein. In some examples, aspects of the operations of 1010 may be performed by a key manager 730 as described with reference to FIG. 7.

At 1015, the method may include generating multiplexed information based on multiplexing the first secure physical uplink channel and the second secure physical uplink channel. The operations of 1015 may be performed in accordance with examples as disclosed herein. In some examples, aspects of the operations of 1015 may be performed by a multiplex manager 735 as described with reference to FIG. 7.

At 1020, the method may include encrypting the multiplexed information based on the secret key. The operations of 1020 may be performed in accordance with examples as disclosed herein. In some examples, aspects of the operations of 1020 may be performed by an encryption manager 740 as described with reference to FIG. 7.

At 1025, the method may include transmitting the encrypted multiplexed information on a resource associated with the first secure physical uplink channel or a resource associated with the second secure physical uplink channel. The operations of 1025 may be performed in accordance with examples as disclosed herein. In some examples, aspects of the operations of 1025 may be performed by a resource manager 745 as described with reference to FIG. 7.

The following provides an overview of aspects of the present disclosure:

Aspect 1: A method for wireless communication, comprising: selecting a first secure physical uplink channel and a second secure physical uplink channel for multiplexing based at least in part on the first secure physical uplink channel and second secure physical uplink channel overlapping; generating a secret key based at least in part on selecting the first secure physical uplink channel and the second secure physical uplink channel for multiplexing in accordance with the first secure physical uplink channel overlapping the second secure physical uplink channel in time; generating multiplexed information based at least in part on multiplexing the first secure physical uplink channel and the second secure physical uplink channel; and encrypting the multiplexed information based at least in part on the secret key.

Aspect 2: The method of aspect 1, further comprising: transmitting the encrypted multiplexed information on a resource associated with the first secure physical uplink channel or a resource associated with the second secure physical uplink channel.

Aspect 3: The method of any of aspects 1 through 2, wherein generating the secret key comprises: using a first physical channel key associated with the first secure physical uplink channel and a second physical channel key associated with the second secure physical uplink channel to generate the secret key.

Aspect 4: The method of any of aspects 1 through 3, wherein generating the secret key comprises: determining a security state of a first physical channel key associated with the first secure physical uplink channel exceeds a security state of a second physical channel key associated with the second secure physical uplink channel; and using a copy of the first physical channel key as the secret key based at least in part on the security state of the first physical channel key exceeding the security state of the second physical channel key.

Aspect 5: The method of any of aspects 1 through 4, wherein generating the secret key comprises: determining a security state of a first physical channel key associated with the first secure physical uplink channel matches a security state of a second physical channel key associated with the second secure physical uplink channel; determining the first secure physical uplink channel is associated with a higher priority than the second secure physical uplink channel based at least in part on the security state of the first physical channel key matching the security state of the second physical channel key; and using a copy of the first physical channel key as the secret key based at least in part on the first secure physical uplink channel being associated with the higher priority than the second secure physical uplink channel.

Aspect 6: The method of any of aspects 1 through 5, wherein generating the secret key comprises: determining that the first secure physical uplink channel is associated with a higher priority than the second secure physical uplink channel; and using a copy of a first physical channel key associated with the first secure physical uplink channel as the secret key based at least in part on the first secure physical uplink channel being associated with the higher priority in relation to the second secure physical uplink channel.

Aspect 7: The method of any of aspects 1 through 6, wherein generating the secret key comprises: deriving a new key based at least in part on passing a first physical channel key associated with the first secure physical uplink channel and a second physical channel key associated with the second secure physical uplink channel through a key derivation function, an output of the key derivation function comprising the new key.

Aspect 8: The method of any of aspects 1 through 7, further comprising: receiving, from a base station, a security configuration indicating which physical channel key to use between a first physical channel key associated with the first secure physical uplink channel and a second physical channel key associated with the second secure physical uplink channel.

Aspect 9: The method of aspect 8, wherein generating the secret key comprises: using a copy of the first physical channel key as the secret key based at least in part on the security configuration.

Aspect 10: The method of any of aspects 8 through 9, wherein a first binary value in the security configuration indicates to use a lower priority channel between the first secure physical uplink channel and the second secure physical uplink channel, a second binary value in the security configuration indicates to use a higher priority channel between the first secure physical uplink channel and the second secure physical uplink channel.

Aspect 11: The method of any of aspects 8 through 10, wherein the security configuration comprises a bitmap or a key derivation function, the security configuration indicating to use at least a portion of a first physical channel key associated with the first secure physical uplink channel or at least a portion of a second physical channel key associated with the second secure physical uplink channel, or both, with the bitmap or the key derivation function to generate the secret key.

Aspect 12: The method of any of aspects 8 through 11, wherein the security configuration is received in a downlink control information, radio resource control, or media access control control element, or any combination thereof.

Aspect 13: The method of any of aspects 1 through 12, further comprising: determining a first security state of a first physical channel key associated with the first secure physical uplink channel and a second security state of a second physical channel key associated with the second secure physical uplink channel; and determining whether the first security state or the second security state, or both, satisfy a security threshold, wherein generating the secret key is based at least in part on whether the first security state or the second security state, or both, satisfy the security threshold.

Aspect 14: The method of any of aspects 1 through 13, further comprising: tracking a quality of the secret key based at least in part on a security degradation function.

Aspect 15: The method of aspect 14, further comprising: generating a second secret key to replace the secret key when the quality of the secret key does not satisfy a quality threshold.

Aspect 16: The method of any of aspects 14 through 15, wherein the security degradation function computes the quality of the secret key based at least in part on a dividend value, an addend value, and a usage number that indicates a number of times the secret key has been used.

Aspect 17: The method of aspect 16, wherein the dividend value, the addend value, or the security degradation function, or any combination thereof, are defined in a security configuration.

Aspect 18: The method of any of aspects 14 through 17, further comprising: indicating to a base station an acknowledgement to use the security degradation function to track the quality of the secret key.

Aspect 19: The method of any of aspects 14 through 18, further comprising: applying the security degradation function each time the secret key is used.

Aspect 20: The method of any of aspects 1 through 19, further comprising: tracking a quality of the secret key based at least in part on a security degradation timer.

Aspect 21: The method of aspect 20, wherein the security degradation timer is defined in a security configuration.

Aspect 22: The method of any of aspects 1 through 21, wherein the first secure physical uplink channel is secured by a first physical channel key and the second secure physical uplink channel is secured by a second physical channel key, an upper layer provides the first physical channel key and the second physical channel key to a physical layer associated with the first secure physical uplink channel and the second secure physical uplink channel.

Aspect 23: The method of any of aspects 1 through 22, wherein the first secure physical uplink channel is secured by a first set of physical channel parameters and the second secure physical uplink channel is secured by a second set of physical channel parameters.

Aspect 24: The method of any of aspects 1 through 23, wherein the first set of physical channel parameters comprise one or more first random timing values associated with a transmitter or a receiver, or both, of the first secure physical uplink channel, the second set of physical channel parameters comprise one or more second random timing values associated with a transmitter or a receiver, or both, of the second secure physical uplink channel.

Aspect 25: The method of any of aspects 1 through 24, wherein the first random timing values or the second random timing values, or both, are based at least in part on a time stamp of a transmission, a time stamp of a reception, a period of time between a transmission and a reception, a period of time between a reception and a transmission, a period of time between a first transmission and a second transmission, or a period of time between a first reception and a second reception, or any combination thereof.

Aspect 26: An apparatus for wireless communication, comprising a processor; memory coupled with the processor; and instructions stored in the memory and executable by the processor to cause the apparatus to perform a method of any of aspects 1 through 25.

Aspect 27: An apparatus for wireless communication, comprising at least one means for performing a method of any of aspects 1 through 25.

Aspect 28: A non-transitory computer-readable medium storing code for wireless communication, the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
    selecting a first secure physical uplink channel and a second secure physical uplink channel for multiplexing based at least in part on the first secure physical uplink channel and the second secure physical uplink channel overlapping;
    generating a secret key based at least in part on selecting the first secure physical uplink channel and the second secure physical uplink channel for multiplexing in accordance with the first secure physical uplink channel overlapping the second secure physical uplink channel in time;
    generating multiplexed information based at least in part on multiplexing the first secure physical uplink channel and the second secure physical uplink channel;
    encrypting the multiplexed information based at least in part on the secret key;
    indicating to a base station an acknowledgement to use a security degradation function to track a quality of the secret key based on values defined in a security configuration signaled in downlink control information (DCI), radio resource control (RRC), media access control (MAC) control element (MAC-CE), or any combination thereof; and
    transmitting the encrypted multiplexed information on a resource associated with the first secure physical uplink channel or a resource associated with the second secure physical uplink channel.

2. The method of claim 1, wherein generating the secret key comprises:
    using the first physical channel key associated with the first secure physical uplink channel and a second physical channel key associated with the second secure physical uplink channel to generate the secret key.

3. The method of claim 1, wherein generating the secret key comprises:
    determining a security state of the first physical channel key associated with the first secure physical uplink channel exceeds a security state of a second physical channel key associated with the second secure physical uplink channel; and
    using a copy of the first physical channel key as the secret key based at least in part on the security state of the first physical channel key exceeding the security state of the second physical channel key.

4. The method of claim 1, wherein generating the secret key comprises:
    determining that the first secure physical uplink channel is associated with a higher priority than the second secure physical uplink channel; and
    using a copy of the first physical channel key associated with the first secure physical uplink channel as the secret key based at least in part on the first secure physical uplink channel being associated with the higher priority in relation to the second secure physical uplink channel.

5. The method of claim 1, wherein generating the secret key comprises:
    deriving a new key based at least in part on passing the first physical channel key associated with the first secure physical uplink channel and a second physical channel key associated with the second secure physical uplink channel through a key derivation function, an output of the key derivation function comprising the new key.

6. The method of claim 1, further comprising:
    receiving, from a base station, a security configuration indicating which physical channel key to use between the first physical channel key associated with the first secure physical uplink channel and a second physical channel key associated with the second secure physical uplink channel.

7. The method of claim 6, wherein generating the secret key comprises:
    using a copy of the first physical channel key as the secret key based at least in part on the security configuration.

8. The method of claim 6, wherein a first binary value in the security configuration indicates to use a lower priority channel between the first secure physical uplink channel and the second secure physical uplink channel,
    a second binary value in the security configuration indicates to use a higher priority channel between the first secure physical uplink channel and the second secure physical uplink channel.

9. The method of claim 6, wherein the security configuration comprises a bitmap or a key derivation function, the security configuration indicating to use at least a portion of the first physical channel key associated with the first secure physical uplink channel or at least a portion of a second physical channel key associated with the second secure physical uplink channel, or both, with the bitmap or the key derivation function to generate the secret key.

10. The method of claim 6, wherein the security configuration is received in a downlink control information, radio resource control, or media access control control element, or any combination thereof.

11. The method of claim 1, further comprising:
determining a first security state of the first physical channel key associated with the first secure physical uplink channel and a second security state of a second physical channel key associated with the second secure physical uplink channel; and
determining whether the first security state or the second security state, or both, satisfy a security threshold, wherein generating the secret key is based at least in part on whether the first security state or the second security state, or both, satisfy the security threshold.

12. The method of claim 1, further comprising:
tracking the quality of the secret key based at least in part on the security degradation function.

13. The method of claim 12, further comprising:
generating a second secret key to replace the secret key when the quality of the secret key does not satisfy a quality threshold.

14. The method of claim 12, wherein the values used by the security degradation function to compute the quality of the secret key are based at least in part on a dividend value, an addend value, and a usage number that indicates a number of times the secret key has been used.

15. The method of claim 14, wherein the dividend value, the addend value, or the security degradation function, or any combination thereof, are defined in the security configuration.

16. The method of claim 12, further comprising:
applying the security degradation function each time the secret key is used.

17. The method of claim 1, further comprising:
tracking a quality of the secret key based at least in part on a security degradation timer.

18. The method of claim 17, wherein the security degradation timer is defined in a security configuration.

19. The method of claim 1, wherein the first secure physical uplink channel is secured by the first physical channel key and the second secure physical uplink channel is secured by a second physical channel key,
an upper layer provides the first physical channel key and the second physical channel key to a physical layer associated with the first secure physical uplink channel and the second secure physical uplink channel.

20. The method of claim 1, wherein the first secure physical uplink channel is secured by a first set of physical channel parameters and the second secure physical uplink channel is secured by a second set of physical channel parameters.

21. The method of claim 20, wherein the first set of physical channel parameters comprise one or more first random timing values associated with a transmitter or a receiver, or both, of the first secure physical uplink channel,
the second set of physical channel parameters comprise one or more second random timing values associated with a transmitter or a receiver, or both, of the second secure physical uplink channel.

22. The method of claim 21, wherein the one or more first random timing values or the one or more second random timing values, or both, are based at least in part on a time stamp of a transmission, a time stamp of a reception, a period of time between a transmission and a reception, a period of time between a reception and a transmission, a period of time between a first transmission and a second transmission, or a period of time between a first reception and a second reception, or any combination thereof.

23. A method for wireless communication, comprising:
selecting a first secure physical uplink channel and a second secure physical uplink channel for multiplexing based at least in part on the first secure physical uplink channel and the second secure physical uplink channel overlapping;
generating a secret key based at least in part on selecting the first secure physical uplink channel and the second secure physical uplink channel for multiplexing in accordance with the first secure physical uplink channel overlapping the second secure physical uplink channel in time;
generating multiplexed information based at least in part on multiplexing the first secure physical uplink channel and the second secure physical uplink channel; and
encrypting the multiplexed information based at least in part on the secret key;
wherein generating the secret key comprises:
determining a security state of a first physical channel key associated with the first secure physical uplink channel matches a security state of a second physical channel key associated with the second secure physical uplink channel;
determining the first secure physical uplink channel is associated with a higher priority than the second secure physical uplink channel based at least in part on the security state of the first physical channel key matching the security state of the second physical channel key; and
using a copy of the first physical channel key as the secret key based at least in part on the first secure physical uplink channel being associated with the higher priority than the second secure physical uplink channel.

24. An apparatus for wireless communication, comprising:
one or more processors;
memory coupled with the one or more processors; and
instructions stored in the memory and executable by the one or more processors to cause the apparatus to:
select a first secure physical uplink channel and a second secure physical uplink channel for multiplexing based at least in part on the first secure physical uplink channel and the second secure physical uplink channel overlapping;
generate a secret key based at least in part on selecting the first secure physical uplink channel and the second secure physical uplink channel for multiplexing in accordance with the first secure physical uplink channel overlapping the second secure physical uplink channel in time, wherein generating the secret key is further based at least in part on a first physical channel key associated with the first secure physical uplink channel;
generate multiplexed information based at least in part on multiplexing the first secure physical uplink channel and the second secure physical uplink channel;
encrypt the multiplexed information based at least in part on the secret key;
indicate to a base station an acknowledgement to use a security degradation function to track a quality of the secret key based on values defined in a security configuration signaled in downlink control information (DCI), radio resource control (RRC), media access control (MAC) control element (MAC-CE), or any combination thereof; and transmit the encrypted multiplexed information on a resource associated with the first secure physical uplink channel or a resource associated with the second secure physical uplink channel.

25. The apparatus of claim 24, wherein the instructions to generate the secret key are executable by the one or more processors to cause the apparatus to:

use the first physical channel key associated with the first secure physical uplink channel and a second physical channel key associated with the second secure physical uplink channel to generate the secret key.

26. An apparatus for wireless communication, comprising:

means for selecting a first secure physical uplink channel and a second secure physical uplink channel for multiplexing based at least in part on the first secure physical uplink channel and the second secure physical uplink channel overlapping;

means for generating a secret key based at least in part on selecting the first secure physical uplink channel and the second secure physical uplink channel for multiplexing in accordance with the first secure physical uplink channel overlapping the second secure physical uplink channel in time;

means for generating multiplexed information based at least in part on multiplexing the first secure physical uplink channel and the second secure physical uplink channel;

means for encrypting the multiplexed information based at least in part on the secret key;

means for indicating to a base station an acknowledgement to use a security degradation function to track a quality of the secret key based on values defined in a security configuration signaled in downlink control information (DCI), radio resource control (RRC), media access control (MAC) control element (MAC-CE), or any combination thereof; and means for transmitting the encrypted multiplexed information on a resource associated with the first secure physical uplink channel or a resource associated with the second secure physical uplink channel.

27. A non-transitory computer-readable medium storing code for wireless communication, the code comprising instructions executable by a processor to:

select a first secure physical uplink channel and a second secure physical uplink channel for multiplexing based at least in part on the first secure physical uplink channel and the second secure physical uplink channel overlapping;

generate a secret key based at least in part on selecting the first secure physical uplink channel and the second secure physical uplink channel for multiplexing in accordance with the first secure physical uplink channel overlapping the second secure physical uplink channel in time;

generate multiplexed information based at least in part on multiplexing the first secure physical uplink channel and the second secure physical uplink channel;

encrypt the multiplexed information based at least in part on the secret key;

indicate to a base station an acknowledgement to use a security degradation function to track a quality of the secret key based on values defined in a security configuration signaled in downlink control information (DCI), radio resource control (RRC), media access control (MAC) control element (MAC-CE), or any combination thereof; and transmit the encrypted multiplexed information on a resource associated with the first secure physical uplink channel or a resource associated with the second secure physical uplink channel.

* * * * *